US009679152B1

(12) United States Patent
Young et al.

(10) Patent No.: US 9,679,152 B1
(45) Date of Patent: Jun. 13, 2017

(54) AUGMENTED REALITY SECURITY ACCESS

(71) Applicant: Wells Fargo Bank,N.A., San Francisco, CA (US)

(72) Inventors: Brian Michael Young, Nolensville, TN (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/340,255

(22) Filed: Jul. 24, 2014

(51) Int. Cl.
G06F 7/04 (2006.01)
G06F 21/62 (2013.01)

(52) U.S. Cl.
CPC .................. *G06F 21/6209* (2013.01)

(58) Field of Classification Search
CPC ............ H04L 9/32; H04L 63/105; G09C 1/04
USPC ........................... 726/5–7; 235/382; 709/223
See application file for complete search history.

(56) References Cited

U.S. PATENT DOCUMENTS

| 5,590,038 | A | 12/1996 | Pitroda |
| 6,715,679 | B1 | 4/2004 | Infosino |
| 7,059,520 | B1 | 6/2006 | Shtesl |
| 7,472,829 | B2* | 1/2009 | Brown ............. G06K 19/06206 235/380 |
| 8,430,310 | B1* | 4/2013 | Ho .......................... G06F 21/35 235/382 |
| 8,438,110 | B2 | 5/2013 | Calman et al. |
| 8,447,067 | B2 | 5/2013 | Rhoads et al. |
| 8,466,773 | B2* | 6/2013 | Willgert ................. G06F 21/35 340/425.1 |
| 8,547,401 | B2 | 10/2013 | Mallinson et al. |
| 8,577,731 | B1 | 11/2013 | Cope et al. |
| 9,092,600 | B2* | 7/2015 | Scavezze ................ G06F 21/31 |
| 9,111,418 | B2 | 8/2015 | Arumugam et al. |
| 9,274,595 | B2* | 3/2016 | Reitan ..................... G06F 3/011 |
| 9,319,419 | B2* | 4/2016 | Sprague ................ H04L 63/126 |
| 2007/0101152 | A1* | 5/2007 | Mercredi ................ G06F 21/34 713/185 |

(Continued)

FOREIGN PATENT DOCUMENTS

WO 2010128451 A2 11/2010
WO 2013120473 A1 8/2013

OTHER PUBLICATIONS

RSA Secure ID Authentication, 2001, RSA Publication, p. 1-5.*

(Continued)

*Primary Examiner* — Hadi Armouche
*Assistant Examiner* — Viral Lakhia
(74) *Attorney, Agent, or Firm* — Merchant & Gould P.C.

(57) ABSTRACT

A method implemented on an augmented reality (AR) electronic device includes initiating a security access code software application on the AR electronic device. A user of the AR electronic device is identified. A first electronic computing device at or near a current location of the user is identified. The first electronic computing device is an input device for entry of a security code to permit access to a protected asset. A determination is made as to whether the user is authorized to access the protected asset. When a determination is made that the user is authorized to access the protected asset, a security access code is displayed on the AR electronic device. The security access code permits the user to access the protected asset via the first electronic computing device.

12 Claims, 4 Drawing Sheets

(56) References Cited

U.S. PATENT DOCUMENTS

| | | | |
|---|---|---|---|
| 2008/0086637 A1* | 4/2008 | Royalty | H04L 63/105 713/168 |
| 2008/0240440 A1* | 10/2008 | Rose | H04L 63/08 380/277 |
| 2009/0073084 A1* | 3/2009 | Mullen | G06F 1/1624 345/8 |
| 2009/0158206 A1 | 6/2009 | Myllyla | |
| 2011/0055049 A1* | 3/2011 | Harper | G06F 3/011 705/27.1 |
| 2011/0061100 A1* | 3/2011 | Mattila | G06F 3/017 726/17 |
| 2011/0173576 A1 | 7/2011 | Murphy et al. | |
| 2011/0202466 A1* | 8/2011 | Carter | G06Q 20/3674 705/67 |
| 2011/0202984 A1* | 8/2011 | Hird | G06F 21/31 726/7 |
| 2012/0060226 A1 | 3/2012 | Park et al. | |
| 2012/0074232 A1 | 3/2012 | Spodak et al. | |
| 2012/0115513 A1 | 5/2012 | Han | |
| 2012/0204307 A1* | 8/2012 | De Mattei | A41D 1/002 2/69 |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2012/0286936 A1 | 11/2012 | Mullen et al. | |
| 2012/0290449 A1 | 11/2012 | Mullen et al. | |
| 2013/0024222 A1 | 1/2013 | Dunn | |
| 2013/0033522 A1 | 2/2013 | Calman et al. | |
| 2013/0042327 A1 | 2/2013 | Chow | |
| 2013/0055356 A1 | 2/2013 | Gafni | |
| 2013/0166441 A1 | 6/2013 | Kobylkin et al. | |
| 2013/0191250 A1* | 7/2013 | Bradley | G06Q 30/0623 705/26.61 |
| 2013/0204993 A1* | 8/2013 | Uribe-Etxebarria Jimenez | G06Q 10/10 709/223 |
| 2013/0205373 A1 | 8/2013 | Jaudon et al. | |
| 2013/0210523 A1 | 8/2013 | Arumugam et al. | |
| 2013/0218721 A1 | 8/2013 | Borhan et al. | |
| 2013/0268775 A1 | 10/2013 | Hawkins | |
| 2014/0076965 A1 | 3/2014 | Becorest et al. | |
| 2014/0096220 A1* | 4/2014 | Da Cruz Pinto | G06F 21/00 726/9 |
| 2014/0196119 A1* | 7/2014 | Hill | G06F 21/32 726/4 |
| 2014/0214665 A1 | 7/2014 | Lee et al. | |
| 2014/0237578 A1* | 8/2014 | Bryant | G06Q 10/10 726/7 |
| 2014/0329497 A1* | 11/2014 | Sanzgiri | H04W 12/06 455/411 |
| 2015/0074800 A1* | 3/2015 | Farraro | G06F 21/35 726/20 |
| 2015/0089607 A1* | 3/2015 | Hubner | H04L 63/0838 726/6 |
| 2015/0102907 A1* | 4/2015 | Hadizad | G07C 9/00007 340/5.64 |
| 2015/0278871 A1* | 10/2015 | Wolfe | G06Q 30/0267 705/14.58 |
| 2015/0287076 A1 | 10/2015 | Soon-Shiong | |
| 2015/0348214 A1* | 12/2015 | Jain | G06Q 40/125 705/14.58 |
| 2015/0356812 A1 | 12/2015 | Arumugam et al. | |

OTHER PUBLICATIONS

Wallaby Introduces First Financial App for Google Glass with Launch of Pay With Wallaby, PR Newswire, Feb. 12, 2014, 2 pages.

Rekimoto et al., "CyberCode: Designing Augmented Reality Environments with Visual Tags," Sony Computer Science Laboratories, Inc., 2000, 10 pages.

Jacqueline Lee, "NXT-ID Announces 'Wocket,' a Mobile Wallet Within a Smart Card," http://www.mobilecommerceinsider.com/topics/mobilecommerceinsider/articles/362470-nxt-id-announces-wocket-mobile-wallet-with-a.htm, Dec. 4, 2013, 3 pages.

Roesner et al., "Security and Privacy for Augmented Reality Systems," Communications of the ACM, vol. 57 No. 4, Apr. 2014, pp. 88-96.

U.S. Appl. No. 14/340,158, filed Jul. 24, 2014 entitled "Augmented Reality Numberless Transaction Card".

* cited by examiner

AUGMENTED REALITY SECURITY ACCESS

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) electronic device. The method comprises: at the AR electronic device, initiating a security access code software application on the AR electronic device; identifying a user of the AR electronic device; identifying a first electronic computing device at or near a current location of the user, the first electronic computing device being an input device for entry of a security code to permit access to a protected asset; determining whether the user is authorized to access the protected asset; when a determination is made that the user is authorized to access the protected asset, displaying a security access code on the AR electronic device, wherein the security access code permits the user to access the protected asset via the first electronic computing device.

In another aspect, an AR electronic device comprises: a camera; an optical head-mounted display; a processing unit; and system memory, the system memory including instructions which, when executed by the processing unit, cause the AR electronic device to: initiate a security access code software application on the AR electronic device; identify a user of the AR electronic device; identify a first electronic computing device at or near the current location of the user, the first electronic computing device being an input device for entry of a security code to permit access to a protected asset; determine whether the user is authorized to use the AR electronic device; when a determination is made that the user is authorized to use the AR electronic device, display a security access code on the AR electronic device, wherein the security access code permits the user to access the protected asset via the first electronic computing device.

In yet another aspect, an AR electronics device comprises: a camera; an optical head-mounted display; a processing unit; and system memory, the system memory including instructions which, when executed by the processing unit, cause the AR electronic device to: initiate a security access code software application on the AR electronic device; identify a user of the AR electronic device, the identity of the user being determined by one of voice recognition, retinal recognition, facial recognition or finger print recognition; determine whether the user of the AR electronic device is authorized to view a security access code for a protected asset; determine whether the AR electronic device is an authorized device; identify a current location of the user of the AR electronic device; identify a security access code input device at or near the current location of the user, the security access code input device requiring an entry of a security code to permit access to the protected asset via the security access code input device or to access a secure area via the security access code input device, the identity of the security access code input device being determined via an object recognition software application of the AR electronic device; determine whether the user is authorized to use the AR electronic device at the current location; and when a determination is made that the user of the AR electronic device is authorized to view the access code and when a determination is made that the AR electronic device is an authorized device and when a determination is made that the user of the AR electronic device is authorized to use the AR electronic device at the current location: generate a security access code on the AR electronic device; and display the security access code on the AR electronic device, wherein the security access code permits the user to access the protected asset via the security access code input device.

The details of one or more techniques are set forth in the accompanying drawings and the description below. Other features, objects, and advantages of these techniques will be apparent from the description, drawings, and claims.

DETAILED DESCRIPTION

Figure 1:
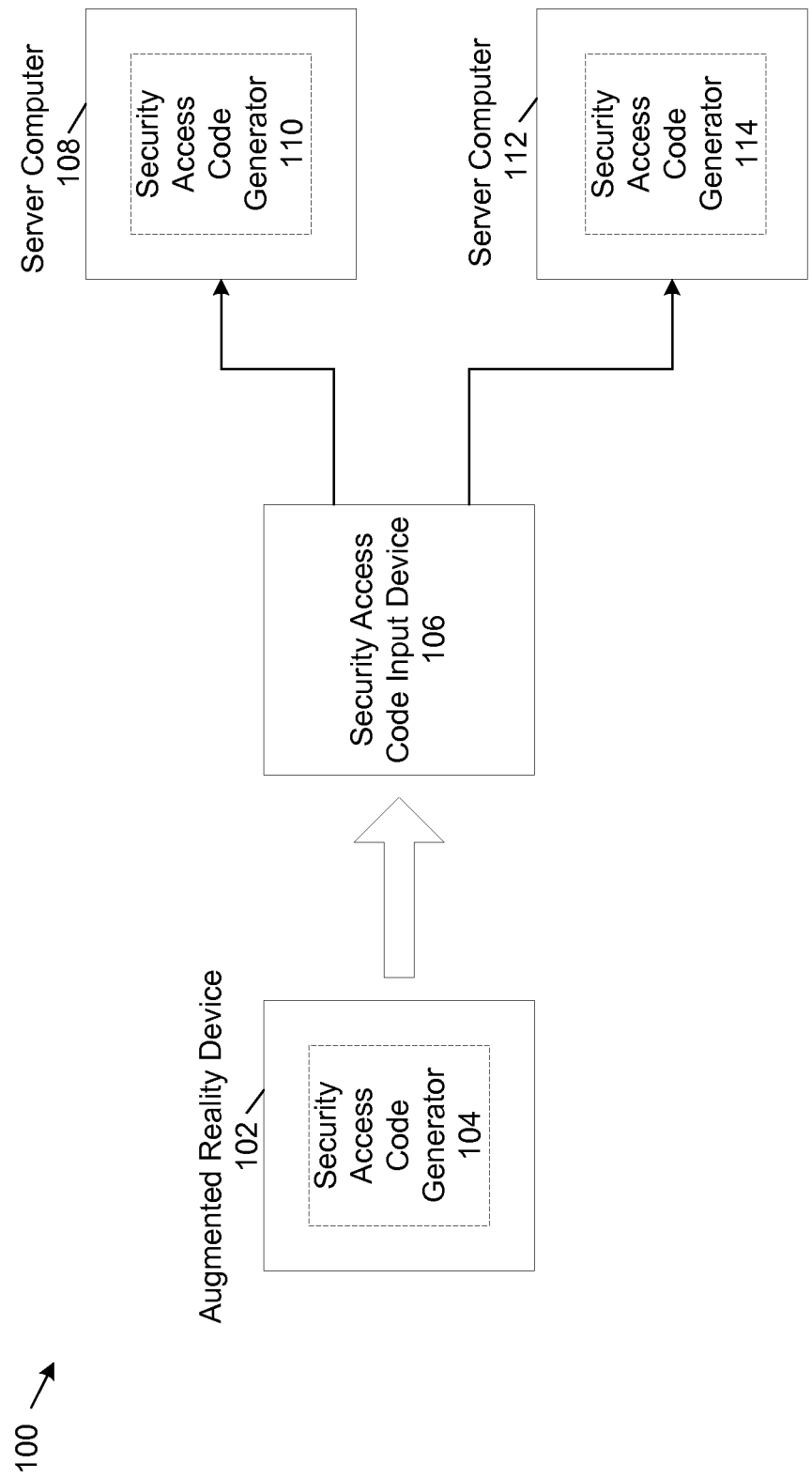
FIG. 1 shows an example system that may be used for augmented reality (AR) security access.

The present disclosure is directed to systems and methods for generating a security access code on an augmented reality (AR) device. The security access code generated on the AR device provides an additional level of security for obtaining access to an electronic computing device. In some embodiments, the electronic computing device is a server computer that requires secure access. The security access code may also be used to obtain access to a specific area of a building, such as a vault or high security area. Other uses for the security access code are possible. In this disclosure, devices or areas such as the server computer, vault and high security area of a building that require the additional level of security for obtaining access are referred to as protected assets.

In an example application, the security access code generated by the AR device is synchronized with a security access code generated on the server computer. The security access codes are programmed to change on a periodic basis, for example every 30 seconds. Other time intervals may be used. When a user of the AR device is authenticated, each security access code generated by the AR device is projected on a display screen of the AR device. When the user of the AR device enters the security access code into an input device such as a keyboard of a client computer, the security access code is sent to the server computer.

When the security access code generated by the AR device and entered into the input device matches a security access code generated on the server computer, the user is permitted access to the server computer. In one implementation, access to the server computer comprises displaying a login screen on the input device, for example on a display screen of the client computer. The user is then permitted to login to the server computer. The security access code provides an additional layer of security to the login process, in addition to a traditional user ID and password.

In some embodiments, the user views the security access code as displayed or projected on the AR device and manually enters the security access code into the input device. However, in some implementations, the AR device may automatically populate the security access code on the input device. For the implementations where the security access code is automatically populated on the input device, a wireless communication session is established between the AR device and the input device. The wireless communications session may use Bluetooth or a similar type of wireless capability.

In some embodiments, the AR device may be used to generate security access codes for a plurality of server computers or other electronic computing devices. A specific server computer to access may be identified via optical recognition or via a verbal command at the AR device. The AR device may then generate a security access code that is synchronized with the specific server computer, as explained later herein. By having a single AR device that can provide security access codes for a plurality of electronic computing devices, an AR device according to the present disclosure can replace standalone security access code generating devices such as a hardware token. Security access code generating devices such as key fobs are typically configured to provide security access code access to a specific electronic computing device. Security access code generating devices such as key fobs also may get lost or stolen.

In some embodiments, multiple levels of authorization are required before a security access code is displayed to the user. First, a determination is made as to whether the AR device is an authorized device. Second, a determination is made as to whether the wearer of the AR device is authorized to view the security access code. Third, a determination is made as to whether the user, the wearer of the AR device, is authorized to view the security access code at a current location of the user. In some implementations, all three levels of authorization are required before the security access code is displayed to the user on the AR device. In other implementations, fewer than the three levels of authorization may be required or other levels of authorization may be required.

For the first level of authorization above, an AR device may need to be registered before a security access code is displayed on the AR device. As one level of security, the determination as to whether the AR device is an authorized device may include determining whether the AR device is a registered device with an issuing company or an otherwise authorized device.

For the second level of authorization above, verification is performed that the wearer of the AR device is authorized to access the server computer. For example, it is possible that a user who is registered for the AR device is authorized to access the server computer but that the wearer of the AR device is not the same person as the user who is registered to access the server computer.

Authentication of the wearer of the AR device may be achieved by one or more methods. The one or methods are typically biometric methods and include retinal scan, facial recognition, voice print and finger print scan. For example, in some implementations the AR device may store a biometric profile for the user of the AR device including one or more of a retinal profile, a facial profile, a voice profile and a finger print profile. In other implementations, the biometric profile may be stored elsewhere, for example on a server computer, and accessed via the AR device. Authentication occurs when data from one or more of the retinal, scan, facial recognition, voice print and finger print scan matches the biometric profile for the user.

For the third level of authorization, verification may be performed regarding a security clearance for a specific location or geographical area. For example, a user may be authorized to access a server computer, but only from a company office. If a determination is made that the user is at a different location, for example at home, the user may not be authorized to access the server computer from the different location. As another example, the user may have access to certain areas of a building but may not have access to other areas of the building, for example a specific laboratory. In some embodiments, the location of the user is determined based on the user's surroundings as captured by elements of the AR device (e.g., camera, microphone) and interpreted by a processor of the AR device using object recognition software. The determination of the location of the user may also be made by other means, such as global positioning system (GPS) software within the AR device, location-specific markers at the location or geographic area, or optical codes (e.g., barcodes or QR codes) on objects at the location or geographic area that can be interpreted by the AR device.

In addition to using the systems and method to provide a security access code for accessing an electronic computing device such as a server computer, the systems and methods may also be used to provide security access codes for other purposes. For example, the security access code generated by the AR device may be used to provide secure access to a mobile banking application, for example to enable a transfer of money between accounts. For example, if the money transfer is performed at a customer's home, the security access code may permit the money transfer to be enabled. The AR device may verify the identity of the user and verify that the money transfer is authorized to be made using the AR device. Other similar types of applications for a security access code are possible.

The systems and methods of the present disclosure are generally described for an AR device that may be worn or carried by a user. An example of and AR device that may be worn by the user is an AR headset. An example of an AR device that may be carried by the user is a smartphone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer can also include voice recognition capability, permitting the user to direct the wearable computer via voice commands. In addition, in some implementations, the wearable computer also includes biometric capability such as facial recognition, retinal scan capability, finger print and voice print capability. The optical display reflects projected images and also permits the user to see through the display.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

FIG. 1 shows an example system 100 that supports AR security access. The example system 100 includes an AR device 102, a security access code input device 106, a server computer 108 and a server computer 112.

AR device 102 may be an AR headset device, such as Google Glass or a smartphone or tablet computer with an AR software application. In some embodiments, the AR device 102 includes a security access code generator 104. The security access code generator 104 generates security access codes that may be used to access server computer 108, server computer 112 and other electronic computing devices, as discussed in more detail later herein.

Security access code input device 106 is an electronic computing device that includes a data entry mechanism, such as a keypad, a keyboard or a touch screen. In some embodiments, the security access code input device 106 is a computing device such as a client computer, a smart telephone or a tablet computer. The security access code input device 106 may also be a standalone input device such as a keypad used to access a secure access area in a building, for example a laboratory.

In the embodiment shown, server computer 108 and server computer 112 are server computers that have a security requirement for access above what is required via from a user ID and password. For example the server computers may contain confidential or security information such that a second level of access is required. More or fewer server computers may be used.

In some embodiments, server computers 108 and 112 each also include a security access code generator. For example server computer 108 includes security access code generator 110 and server computer 112 includes security access code generator 114. Security access code generators 110 and 114 are each synchronized with security access code generator 104, as explained in more detail later herein.

Figure 2:
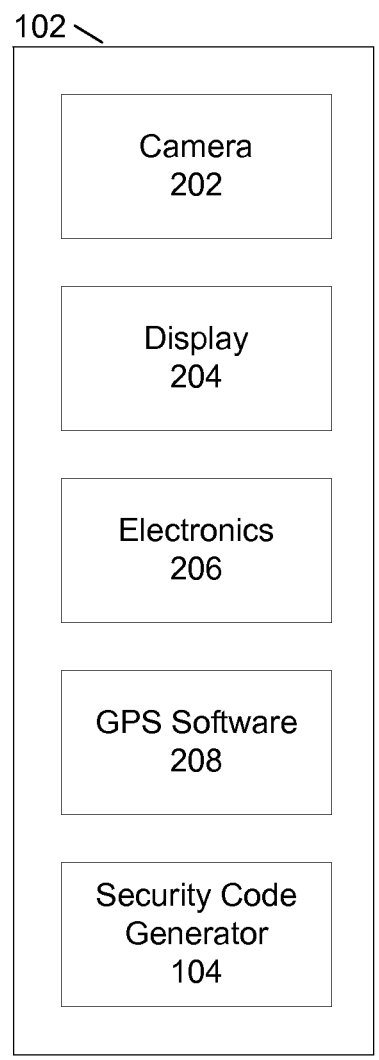
FIG. 2 shows example modules of the AR device of FIG. 1.

FIG. 2 shows example modules 200 of AR device 102. The AR device 102 is an electronic device. The example modules 200 include a camera 202, a display 204, electronics 206, GPS software 208 and security access code generator 104. The camera 202 is a camera that is built-in to AR device 102. Display 204 is a display that is also built-in to AR device 102. Electronics 206 includes an electronic computing device with wireless capability. The wireless capability may include Bluetooth, radio frequency identification (RFID), mobile telecommunications, Wi-Fi, or similar types of wireless capability. GPS software 208 can be a software application that may be installed on the mobile electronic device. When AR device 102 is an AR headset, camera 202, display, 204, electronics 206 and GPS software 208 are part of the AR headset.

The security access code generator 104 provides security access codes for a plurality of server computers and other electronic computing devices. In some embodiments, the security access code generator 104 may generate security access codes via a software algorithm that may run on AR device 102. At least a portion of the software algorithm is of a similar type to a software algorithm running on a server computer to which access is desired. For example, at least a portion of the software algorithm may correspond to a software algorithm running in security access code generator 110 or security access code generator 114.

The software algorithm running on AR device 102 is synchronized with the software algorithm running on the server computer to which access is desired. One way in which synchronization may occur is by having an internal clock on AR device 102 synchronized with an internal clock on the server computer to which access is desired. The software algorithm may be such that a time of day generated by the internal clock is used by the software algorithm to generate a security access code. When the internal clocks of AR device 102 and the server computer are synchronized, the same security access code is generated on AR device 102 at a specific time as another security access code generated on the server computer at the same specific time. In this way the security access codes generated on AR device 102 and on the server computer are synchronized. Other methods of synchronization besides the use of an internal clock are possible.

As stated earlier herein, the systems and methods permit access to a plurality of computing devices. One or more methods may be used to determine which computing device is to be accessed. In one method, a GPS location of the user may be sufficient to determine which computing device is to be accessed. For example, there may be a computing device at the GPS location so that when the GPS location is identified, a determination is made that the computing device at the GPS location is to be accessed. As another example, geo-fencing devices, beacons, devices that implement near-field communication, or other intra-structure devices that communicate with AR device 102 can be used to allow AR device 102 to determine the user's location. For example, near-field communication may be used within a building to determine when AR device 102 is in close proximity with a near-field communication device within the building.

In addition, object recognition may be used. For example there may be multiple computing devices at a given GPS location, for example a location of a business. AR device 102 may use object recognition software to identify a specific computing device at the given GPS location. For example, in some cases an identification of a computing device may be possible at a given GPS location by identifying a size, shape or other similar characteristic of the computing device. In other cases there may be an identifying tag or other identifier on the computing device. For example, the computing device may have a bar code or other similar tag that may be identified via the object recognition software. AR device 102 can also use object recognition alone to determine the user's location, without the need for GPS location information or local geo-tracking devices.

As a further example, the computing device to be accessed may communicate identifying information directly to AR device 102. For example, as the user approaches the computing device to be accessed, AR device 102 may transmit a request to the computing device for identifying information, or the computing device may detect AR device 102 when AR device 102 is in proximity to the computing device.

Identification of the specific computing device to be accessed is important because, according to embodiments of the present disclosure, AR device 102 generates a security access code that can be used specifically with the computing device to be accessed. As discussed, the security access code generator 104 includes a software application that provides security access codes for a plurality of computing devices. The identification of the specific computing device permits the security access code generator 104 to provide a correct security access code for the computing device to be accessed.

Figure 3:
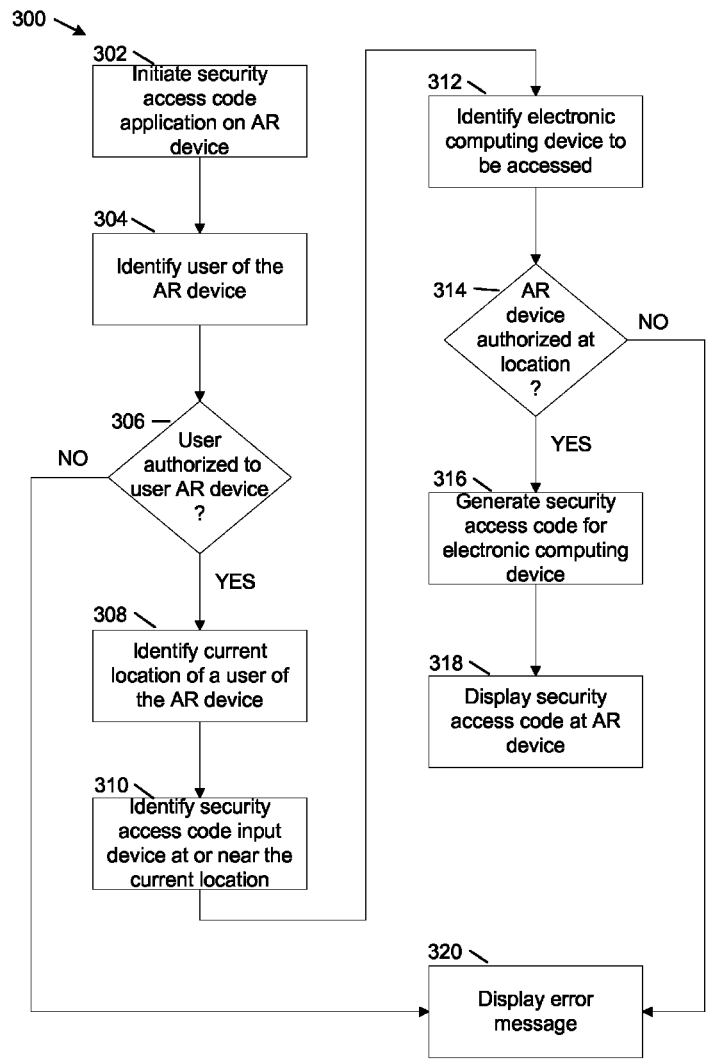
FIG. 3 shows a flowchart for an example method for generating a security access code on the AR device of FIG. 1.

FIG. 3 shows a flowchart of a method 300 for generating a security access code on an AR device, according to an embodiment of the present disclosure. In some embodiments, the AR device is an AR headset with a camera and optical display, similar to Google Glass. In some embodiments, the security access code is used as a first level of access for logging onto a server computer.

At operation 302, a security access code application is activated on the AR device. The security access code application permits the generation of security access codes that may be used as a first level of access for a plurality of electronic computing devices. In some embodiments, the security access code application is activated via a voice command on the AR device. For example the user of the AR device may say "access code" or some other verbal command recognized by the AR device as a command to activate the security access code application. Other ways to activate the security access code application are possible, for example by the user touching an area of the AR device or gesturing in front of the AR device with a gesture that is recognized as a request for a security access code. In still further embodiments, the AR device automatically activates the security access code application when the location detected by the AR device (e.g., based on object recognition, GPS data, and/or local tracking information) indicates the need for a security access code.

At operation 304, the user of the AR device is identified, the user being a person who is wearing the AR device. In some embodiments, the user is identified via a biometric identification method, such as one or more of facial recognition, retina recognition, voice recognition or finger print recognition.

At operation 306, a determination is made as to whether the user is authorized to use the AR device to display a security access code. First a determination is made as to whether the AR device has been registered or otherwise authorized to display the security access code. Next a determination is made as to whether the user is authorized to view the security access code.

At operation 306, when a determination is made the user is authorized to view the security access code on the AR device, at operation 308 an identity of a current location of the user is determined. The identification of the current location of the user is determined by one of several methods including obtaining a GPS location of the user and/or identifying the location of the user via object recognition software on the AR device.

At operation 306, when a determination is made that the user is not authorized to view the security access code on the AR device, at operation 320 a message is displayed on the AR device indicating that the user is not authorized to view the security access code on the AR device. In some embodiments, an alert is also sent to a registered user associated with the AR device (if applicable), a security officer, or other predetermined person, that an unauthorized attempt has been made to access the electronic computing device. The alert can be sent, for example, via email or text message. In some embodiments, the alert is sent after a predetermined number of failed access attempts by the unauthorized device.

At operation 310, an identity of a security access code input device at or near the current location of the user is determined. The security access code input device may be a client computer, a standalone keypad or another input device. The identity of the security access code input device is obtained via one or more of object recognition of the security access code input device or a knowledge of a specific security access code input device at the current location of the user.

At operation 312, an identity of an electronic computing device to be accessed is identified. The electronic computing device to be accessed, for example server computer 108 or server computer 112, is an electronic computing device for which the security access code is to be applied. The electronic computing device may be identified via object recognition of the electronic computing device is physically located at the current location. The electronic computing device may also be identified from knowledge of the identity of the user, a knowledge of which electronic computing devices the user is authorized to access and by the current location of the user. Other ways to identify the electronic computing device to be accessed are possible.

At operation 314, a check is made as to whether the AR device is authorized to provide a security access code for the electronic computing device at the current location. The check is made because some users that may be authorized to use an AR device may only be authorized to receive a security access code for an electronic computing device at a specific location, for example at a corporate location or in a certain area of a building, for example to access a laboratory or high security area.

At operation 314, when a determination is made that the user is authorized to receive a security access code for an electronic computing device on the AR device at the current location, at operation 316, the AR device generates a security access code for use in accessing the electronic computing device. The security access code is generated using a security access code generator on the AR device, for example security access code generator 104 on AR device 102.

At operation 316, the security access code is displayed on the AR device. Typically, the security access code is projected via the display on the AR device, so that the security access code appears as a virtual display. In this way, the security access code is visible only to the user of the AR device. In some embodiments, the user enters the security access code into an input device in order to bring up a login screen for the electronic computing device to be accessed. Alternatively, the security access code provides access to the location secured by the input device (e.g., vault, high security location, etc.). In some embodiments, the input device is a client computer, keypad, or other electronic computing device. In some implementations, the security access code may be automatically populated on the input device.

At operation 314, when a determination is made that the user is not authorized to receive a security access code for an electronic computing device on the AR device at the current location, at operation 320, a message is displayed on the AR device indicating that the user is not authorized to use the AR device for accessing the electronic computing device at the current location. Additionally, in some embodiments, an alert can be generated in response to the unauthorized access as described above.

Figure 4:
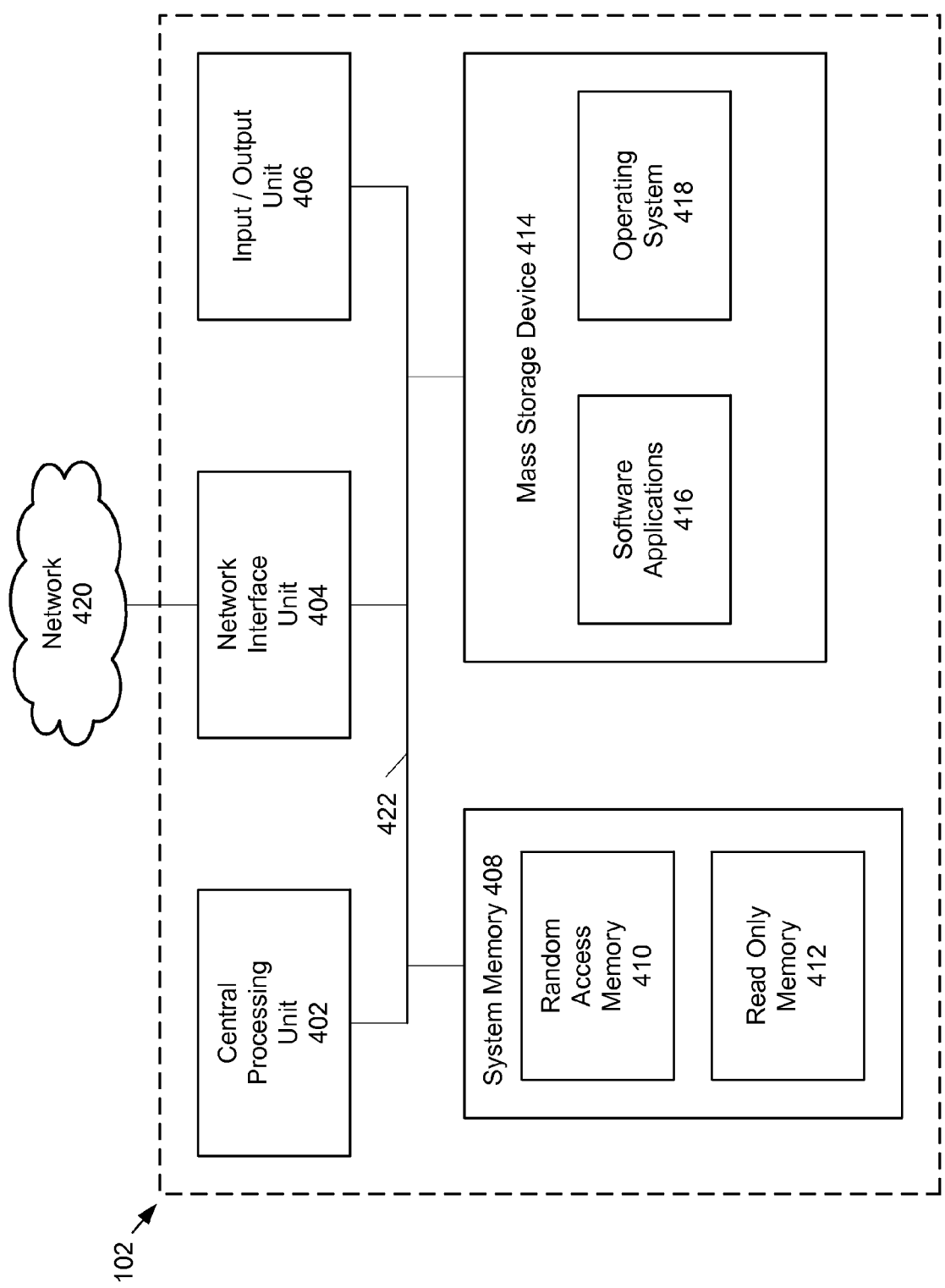
FIG. 4 shows example physical components of the AR device of FIG. 1.

As illustrated in the example of FIG. 4, the AR device 102 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the AR device 102, such as during startup, is stored in the ROM 412. The AR device 102 further includes a mass storage device 414. The mass storage device 414 is able to store software instructions and data. A central processing unit, system memory and mass storage device similar to that in FIG. 4 are also included in server computers 108 and 112.

The mass storage device 414 is connected to the CPU 402 through a mass storage controller (not shown) connected to the system bus 422. The mass storage device 414 and its associated computer-readable data storage media provide non-volatile, non-transitory storage for the AR device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 102.

According to various embodiments of the invention, the AR device 102 may operate in a networked environment using logical connections to remote network devices through the network 420, such as a wireless network, the Internet, or another type of network. The AR device 102 may connect to the network 420 through a network interface unit 404 connected to the system bus 422. It should be appreciated that the network interface unit 404 may also be utilized to connect to other types of networks and remote computing systems. The AR device 102 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the AR device 102 can store software instructions and data. The software instructions include an operating system 418 suitable for controlling the operation of the AR device 102. The mass storage device 414 and/or the RAM 410 also store software instructions, that when executed by the CPU 402, cause the AR device 102 to provide the functionality of the AR device 102 discussed in this document. For example, the mass storage device 414 and/or the RAM 410 can store software instructions that, when executed by the CPU 402, cause the AR device 102 to provide a security access code for an electronic computing device at the location of the AR device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method involving an augmented reality (AR) electronic device, the method comprising:

identifying a user of an AR electronic device, the AR electronic device executing a security access code software application;

identifying a current location of the user through a global positioning system of the AR electronic device;

identifying a first electronic computing device at the identified current location of the user, the first electronic computing device including an input device for keypad entry of a security code to permit access to a protected asset;

communicatively coupling and synchronizing the AR electronic device to the first electronic computing device, the communicative coupling enabling the security access code software application of the AR electronic device to communicate with a security access code software application being executed by the first electronic computing device;

determining whether the user has security clearance to access the protected asset at the current location of the user;

when a determination is made that the user is authorized to access the protected asset, receiving a voice input command at the AR electronic device to cause the security access code software applications at both the AR electronic device and the first electronic computing device to generate a same security access code;

displaying the generated security access code on the AR electronic device;

receiving the displayed security access code via the input device of the first electronic computing device;

comparing the received security access code to the security access code generated by the first electronic computing device, wherein matching of the security access codes permits the user to access the protected asset.

2. The method of claim 1, wherein identifying the user of the AR electronic device comprises:

comparing the voice input command to a voice print for the user.

3. The method of claim 1, wherein the user is identified by one or more of a retinal scan of the user at the AR electronic device, a facial recognition of the user or a finger print scan of the user.

4. The method of claim 1, wherein the protected asset is one of a server computer, a vault or a secure access area of a building.

5. The method of claim 1, further comprising using an object recognition software program on the AR electronic device to identify the first electronic computing device.

6. The method of claim 5, wherein the object recognition software program identifies the first electronic computing device via an identifier on the first electronic computing device.

7. The method of claim 1, wherein the AR electronic device is configured to generate access codes for a plurality of electronic computing devices.

8. The method of claim 7, wherein a software application on the AR electronic device determines which access code to generate based on the identity of the protected asset to be accessed.

9. An augmented reality (AR) electronic device comprising:

a camera;
an optical head-mounted display;
a processing unit; and
system memory, the system memory including instructions which, when executed by the processing unit, cause the AR electronic device to:

execute a security access code software application on the AR electronic device;

identify a user of the AR electronic device;

identify a current location of the user through a global positioning system of the AR electronic device identify a first electronic computing device at the identified current location of the user, the first electronic computing device including an input device for keypad entry of a security code to permit access to a protected asset;

communicatively couple and synchronize the AR electronic device to the first electronic computing device, the communicative coupling enabling the security access code software application of the AR electronic device to communicate with a security access code software application being executed by the first electronic computing device;

determine, through voice recognition at the the AR electronic device, whether the user is authorized to use the AR electronic device;

determine whether the user has security clearance to access the protected asset at the current location of the user;

when a determination is made that the user is authorized to use the AR electronic device and access the protected asset, receive a voice input command at the AR electronic device to cause the security access code software applications at both the AR electronic device and the first electronic computing device to generate a same security access code and display the generated security access code on the AR electronic device; and receive the displayed security access code via the input device of the first electronic computing device and compare the received security access code to the security access code generated by the first electronic computing device, when the received security access code matches the security access code generated by the first electronic computing device permit the user to access the protected asset.

10. The method of claim 9, wherein the user is identified by a further biometric authentication method, the biometric authentication method being one of retinal recognition, facial recognition or finger print recognition.

11. The method of claim 9, wherein the access code is not displayed on the AR electronic device until a determination is made that 1) the AR electronic device is an authorized device, and 2) the wearer of the AR electronic device is authorized to view the access code.

12. The method of claim 9, wherein the protected asset is one of a server computer, a vault or a secure access area of a building.

* * * * *